(12) United States Patent
Stenberg (10) Patent No.: US 9,986,801 B1
(45) Date of Patent: Jun. 5, 2018

(54) AIRCRAFT INTERIOR PROTECTION SYSTEM

(71) Applicant: The Boeing Company, Chicago, IL (US)

(72) Inventor: Nathaniel James Stenberg, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1058 days.

(21) Appl. No.: 13/948,555

(22) Filed: Jul. 23, 2013

(51) Int. Cl.
    *B60J 1/20*     (2006.01)
    *A45C 11/00*     (2006.01)
    *A44B 18/00*     (2006.01)

(52) U.S. Cl.
    CPC ............ *A45C 11/00* (2013.01); *A44B 18/008* (2013.01)

(58) Field of Classification Search
    CPC ...... B65D 81/3886; B65D 25/34; A61G 5/10; E04G 21/30; B62D 1/06; B60N 2/6018
    USPC .............. 150/154–168; 296/136.01, 136.02; 280/770
    See application file for complete search history.

(56) References Cited

U.S. PATENT DOCUMENTS

| | | | | |
|---|---|---|---|---|
| 3,665,355 A | * | 5/1972 | Sasaki | ................... H01F 7/0215 101/389.1 |
| 4,938,522 A | * | 7/1990 | Herron | ..................... B60J 11/00 150/166 |
| 5,018,232 A | * | 5/1991 | Sachetti | ............... A47C 27/002 5/482 |
| 5,072,979 A | * | 12/1991 | Swinton | ................... B60J 11/06 280/770 |
| 8,146,984 B2 | | 4/2012 | Devereaux | |
| 2002/0194676 A1 | * | 12/2002 | Yang | ...................... A47C 31/11 5/482 |
| 2003/0146630 A1 | * | 8/2003 | Ko | .......................... B60J 11/06 293/128 |

OTHER PUBLICATIONS

"Class 0 12×12 Insulating Blanket with Velcro," Protective Equipment Testing Laboratory, copyright 2005, 1 page, accessed Jun. 26, 2013. http://xpresscartcentral.com/petl/closeup.asp?cid=140&pid=987&offset=0.

"Class 4 18×36 Insulating Blanket with Velcro," Protective Equipment Testing Laboratory, copyright 2005, 1 page, accessed Jun. 26, 2013. http://xpresscartcentral.com/petl/closeup.asp?cid=140&pid=199&offset=0.

"Pyro Shield/Heat Blankets/Needle Mats/Furnace Modules," Pyro Shield, Inc., copyright 2011, 2 pages, accessed Jun. 26, 2013. http://www.pyroshield.com/index.php?option=com_content&view=article&id=26.

\* cited by examiner

*Primary Examiner* — Fenn C Mathew
*Assistant Examiner* — Cynthia Collado
(74) *Attorney, Agent, or Firm* — Yee & Associates, P.C.

(57) ABSTRACT

A method and apparatus for protecting a structure. A surface of the structure is covered with a deformable cover having a first type of connector physically associated with a surface of the deformable cover. The first type of connector is configured to connect to a second type of connector for the structure. The surface of the structure with the deformable cover is protected.

13 Claims, 8 Drawing Sheets

AIRCRAFT INTERIOR PROTECTION SYSTEM

BACKGROUND INFORMATION

1. Field

The present disclosure relates generally to aircraft and, in particular, to protecting structures for aircraft. Still more particularly, the present disclosure relates to a method and apparatus for protecting structures in the interior of an aircraft.

2. Background

Manufacturing an aircraft is a complex process. The process includes assembly of thousands of parts to form the aircraft. For example, barrels, frames, skin panels, or other components may be assembled to form a fuselage. Still other parts such as ribs, spars, skin panels, or other parts may be assembled to form the wings, vertical stabilizers, horizontal stabilizers, and other airfoils for the aircraft.

In the interior of aircraft, different parts are brought into the fuselage and assembled to form various structures in the aircraft. For example, parts may be assembled to form passenger seating, closets, walls, a floor, a ceiling, and other monuments in the interior of the aircraft.

The installation of different parts is performed in stages. In other words, all of the parts for the aircraft are not installed at the same time. For example, a closet in an aircraft may be installed after the floor has been assembled in the aircraft. Other structures such as seats, overhead bins, or other monuments may be installed after installation of the closet.

During the installation of different parts, inconsistencies may occur on already installed parts in the interior of the aircraft. For example, other components in the cabin of the aircraft such as overhead bins, closets, lavatories, or other monuments may be installed after the closet. Scratches, dents, or other inconsistencies may occur on the closet when installing additional components.

Additionally, during testing and certification of the aircraft, equipment may be brought onto the aircraft for testing. Further, different operators may perform operations for testing and certifying the aircraft. The equipment, the operators, or both may result in inconsistencies occurring on different structures in the aircraft.

These inconsistencies during manufacturing, testing, or both may result in reworking portions of monuments with inconsistencies, replacing parts of the closets, such as panels for the walls of the closets, or other operations to remove or reduce the inconsistencies caused by installing other parts. This reworking of inconsistencies results in more time, cost, or both being incurred in manufacturing an aircraft.

Therefore, it would be desirable to have a method and apparatus that take into account at least some of the issues discussed above, as well as other possible issues.

SUMMARY

In one illustrative example, an apparatus comprises a deformable cover and a first type of connector physically associated with a surface of the deformable cover. The deformable cover is configured to change shape. The first type of connector is configured to connect to a second type of connector for a structure.

In another illustrative example, an aircraft protection system comprises a deformable cover, a loop fastener physically associated with a surface of the deformable cover, and a hook fastener physically associated with a structure. The deformable cover is configured to change shape. The loop fastener is configured to connect to the hook fastener on the structure in an aircraft.

In yet another illustrative example, a method for protecting a structure is provided. A surface of the structure is covered with a deformable cover having a first type of connector physically associated with a surface of the deformable cover. The first type of connector is configured to connect to a second type of connector for the structure. The surface of the structure with the deformable cover is protected.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that protective covers may be used on structures in the aircraft. These protective covers may reduce the occurrence of inconsistencies on those structures.

The illustrative embodiments recognize and take into account that one manner in which protective covers may be installed is through designing and manufacturing protective covers that are configured to fit particular structures. For example, a protective cover may be designed for a particular type of seat. The protective cover may include, for example, an opening, a translucent section, a transparent section, or some other feature for the display device of an entertainment system on a headrest of the seat.

These types of protective covers may be especially useful during manufacturing and testing of the aircraft. These protective covers may be removed prior to or after delivery of the aircraft to a customer. The use of these types of protective covers, however, may be more expensive and time-consuming than desired. For example, if a customer orders the same model of an aircraft with different options, protective covers may have to be redesigned for certain structures when the options are different between two aircraft of the same model.

Thus, the illustrative embodiments provide a method and apparatus for protecting the interior of an aircraft. In one illustrative embodiment, an apparatus comprises a deformable cover and a first type of connector. The deformable cover is configured to change shape. The first type of connector is physically associated with a surface of the deformable cover and is configured to connect to a second type of connector on a structure. The connection between the first type of connector and the second type of connector may be made to cover the structure with the deformable cover.

Figure 1:
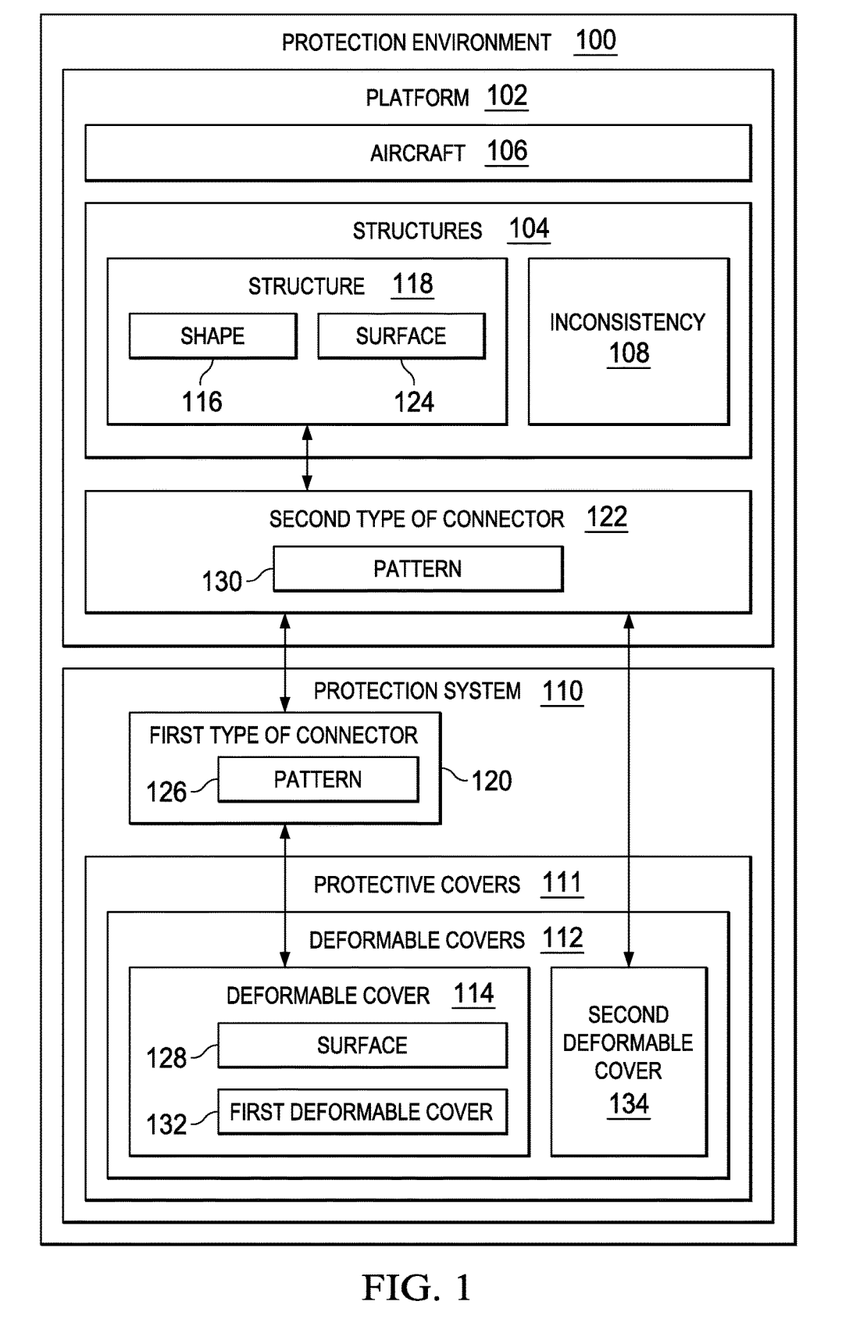
FIG. 1 is an illustration of a block diagram of a protection environment in accordance with an illustrative embodiment.

With reference now to the figures and, in particular, with reference to FIG. 1, an illustration of a block diagram of a protection environment is depicted in accordance with an illustrative embodiment. Protection environment 100 includes platform 102, which has structures 104.

In this illustrative example, platform 102 may be aircraft 106. When platform 102 is aircraft 106, structures 104 may be, for example, at least one of a monument, a closet, a lavatory, a passenger seat, an overhead bin, a door, a doorway, a wall, a floor, or other types of structures 104 for aircraft 106.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

One or more of structures 104 may need protection from the generation of inconsistency 108 on one or more of structures 104. Inconsistency 108 may be one of a scratch, a dent, a tear, a crack, or some other undesirable condition.

In the illustrative example, protection system 110 includes protective covers 111. Protective covers 111 may be used to protect structures 104 from developing inconsistency 108, reducing the severity of inconsistency 108, or both.

As depicted, protective covers 111 take the form of deformable covers 112. In the illustrative example, deformable covers 112 may be connected to each other to cover structures 104. Further, deformable covers 112 may be stacked to provide additional protection for one or more areas of structures 104 when connected to each other and structures 104.

In this illustrative example, deformable cover 114 in deformable covers 112 is configured to change shape. For example, deformable cover 114 may be flexible. In still other illustrative examples, deformable cover 114 may change shape to conform to shape 116 of structure 118 in structures 104. In another illustrative example, deformable cover 114 may be a blanket. Further, deformable cover 114 may be configured to substantially retain the shape in some illustrative examples.

Further, first type of connector 120 is physically associated with deformable cover 114. As depicted, first type of connector 120 is configured to connect to second type of connector 122 for structure 118. For example second type of connector 122 may be on surface 124 of structure 118.

When one component is "physically associated" with another component, the association is a physical association in the depicted examples. For example, a first component, first type of connector 120, may be considered to be physically associated with a second component, deformable cover 114, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, extension of the second component, or both.

In these illustrative examples, first type of connector 120 and second type of connector 122 may take different forms. In one illustrative example, first type of connector 120 may be a loop fastener and second type of connector 122 may be a hook fastener. In another illustrative example, first type of connector 120 may be selected from one of a magnet or a magnetic material and second type of connector 122 may be selected from one of a magnet or a magnetic material. Of course, first type of connector 120 and second type of connector 122 may be selected from any type of fastening system that provides desired features for connecting objects to each other.

As depicted, first type of connector 120 has pattern 126 on surface 128 of deformable cover 114. Second type of connector 122 has pattern 130. Pattern 126 and pattern 130 may be the same or may be different from each other.

In the illustrative example, deformable cover 114 may be first deformable cover 132. Second type of connector 122 may be located on at least one of surface 124 of structure 118 or second deformable cover 134 in deformable covers 112.

As depicted, second type of connector 122 may be connected to surface 124 of structure 118 through the fastening mechanism. This fastening mechanism may be selected from one of an adhesive, a hook, a screw, a rivet, or some other suitable fastening mechanism. In the illustrative example, second type of connector 122 may be on second deformable cover 134. In turn, second deformable cover 134 may be on structure 118 and may or may not be connected to structure 118.

Thus, protection system 110 in protection environment 100 may protect one or more of structures 104 during different operations that may be performed on platform 102 and, in particular, on aircraft 106. In this manner, protection system 110 may be an aircraft protection system in this illustrative example. These operations may be those performed on aircraft 106, such as manufacturing, testing, certifying, operating, maintaining, inspecting, refurbishing, upgrading, or other types of operations.

The illustration of protection environment 100 and the different components in protection environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 102 has been described as aircraft 106, platform 102 may take other forms. As depicted, platform 102 may be selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a dam, a house, a manufacturing facility, a building, or some other suitable platform.

As another illustrative example, first type of connector 120 and second type of connector 122 are shown as separate blocks. In some illustrative examples, these components may be considered part of deformable cover 114. Further, although not shown, deformable cover 114 also may include a second type of connector similar to second type of connector 122 in addition to first type of connector 120.

Figure 2:
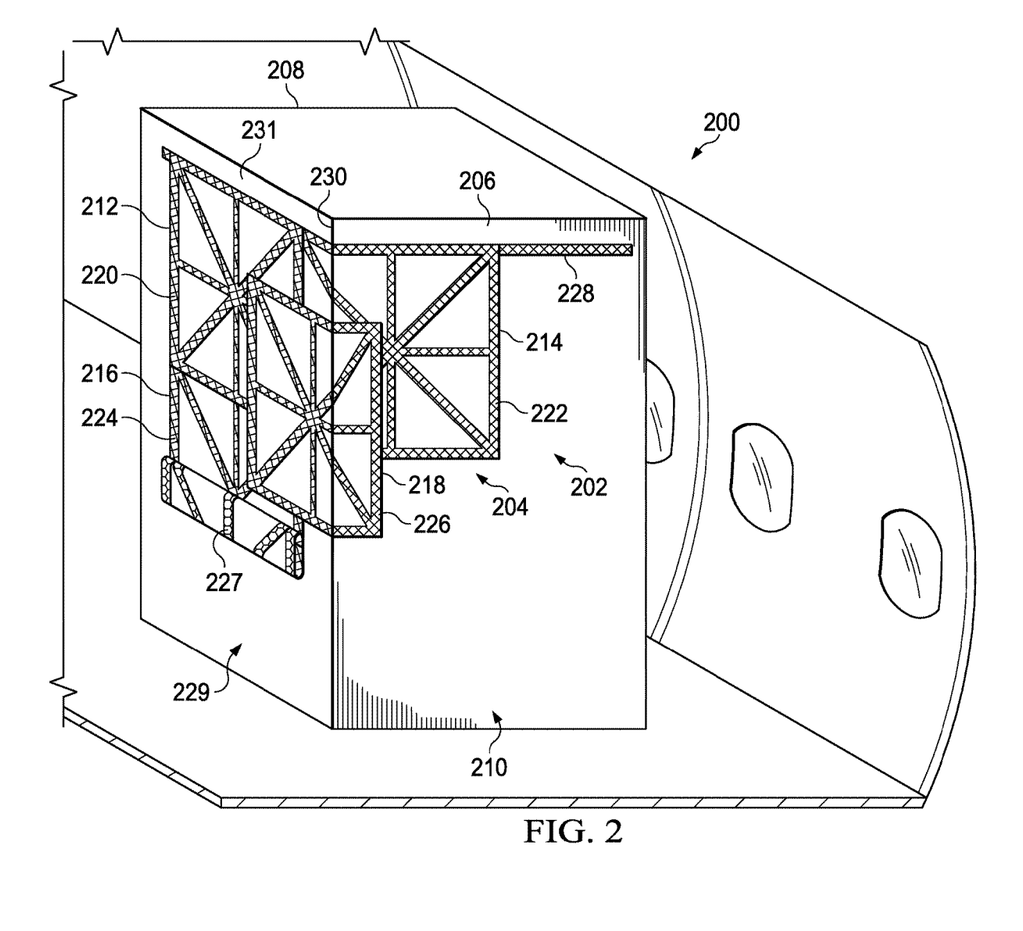
FIG. 2 is an illustration of a passenger cabin with structures in accordance with an illustrative embodiment.

Turning now to FIG. 2, an illustration of a passenger cabin with structures is depicted in accordance with an illustrative embodiment. Passenger cabin 200 is an example of an area that may be located in a physical implementation of aircraft 106 shown in block form in FIG. 1.

As depicted, protection system 202 is an example of one physical implementation of protection system 110 shown in block form in FIG. 1. In this particular example, deformable covers 204 in protection system 202 are connected to wall 206 of closet 208. Some of deformable covers 204 are directly connected to wall 206 while other deformable covers in deformable covers 204 are indirectly connected to wall 206 through other deformable covers in deformable covers 204.

In this illustrative example, deformable covers 204 cover at least a portion of surface 210 of wall 206. Deformable covers 204 may protect the portion of surface 210 from forming an inconsistency. Deformable covers 204 are examples of physical implementations for deformable covers 112 shown in block form in FIG. 1.

As can be seen in this depicted example, deformable covers 204 includes deformable cover 212, deformable cover 214, deformable cover 216, and deformable cover 218. As depicted, deformable cover 212 has hook fastener 220; deformable cover 214 has hook fastener 222; deformable cover 216 has hook fastener 224; and deformable cover 218 has hook fastener 226.

Deformable covers 204 also have loop fasteners on the opposite side of the hook fasteners. As illustrated, deformable cover 216 has loop fastener 227 on the opposite side of hook fastener 224. The loop fasteners for other deformable covers are not seen in this illustration. In this example, hook fastener 224 is an example of a second type of connector that is on an opposite side of loop fastener 227 on deformable cover 216. Loop fastener 227 is an example of a first type of connector. The use of these connectors may allow for the connecting or stacking of deformable covers 204 with each other in forming a protective layer for a structure, such as closet 208.

In this illustrative example, deformable cover 212 and deformable cover 214 are connected to wall 206 of closet 208. In these illustrative examples, deformable cover 212 and deformable cover 214 have loop fasteners (not shown) connected to hook fastener 228 on surface 210 of wall 206. As depicted, hook fastener 228 is connected to surface 210 of wall 206 and connected to surface 229 of wall 231 by an adhesive. In other words, hook fastener 228 is directly connected to the structure, closet 208, in this illustrative example.

Deformable cover 212 and deformable cover 214 may be connected to other deformable covers in deformable covers 204. In other words, the other deformable covers in deformable covers 204 do not have to be connected directly to wall 206 of closet 208 through hook fastener 228.

As depicted, deformable cover 216 is connected to deformable cover 212. Deformable cover 218 is connected to deformable cover 212, deformable cover 216, and deformable cover 214.

In this manner, deformable covers 204 may be placed to provide a desired coverage for surface 210 of wall 206 and for surface 229 of wall 231 for closet 208. For example, deformable cover 214 and deformable cover 218 may be applied around corner 230 of closet 208. In this manner, deformable covers 204 may form a layer on surface 210 of wall 206 and on surface 229 of wall 231 for closet 208 that protects closet 208.

Further, deformable cover 216 may be folded or rolled up to provide additional protection or hold objects. As illustrated, loop fastener 227 is connected to hook fastener 224.

Additionally, with this configuration of loop fastener 227 and hook fastener 224, deformable cover 216 also may be configured to wrap elongate structures. For example, deformable cover 216 may be used to cover a pipe, beam, or some other suitable elongate structure. In other words, deformable cover 216 may be wrapped around an elongate structure using loop fastener 227 and hook fastener 224 located on opposite sides of deformable cover 216. Loop fastener 227 and hook fastener 224 may engage each other in a manner such that deformable cover 216 is wrapped around a structure, such as an elongate structure or some other suitable type of structure, such as a passenger seat.

In this illustrative example, additional protection may be provided when overlap is present between deformable covers 204. For example, deformable cover 218 overlaps a portion of deformable cover 212, deformable cover 214, and deformable cover 216. The areas where this overlap is present have a greater thickness that may provide additional protection against the formation of inconsistencies.

As a result, a custom cover does not need to be designed and manufactured for each structure in an aircraft or other platform. Instead, deformable covers 204 may be placed in a configuration that provides desired coverage for a structure such as closet 208.

In these illustrative examples, the hook fasteners on deformable covers 204 are configured such that they do not face surface 210 of wall 206 for closet 208. In this manner, the likelihood that an inconsistency may be formed on surface 210 of wall 206 may be reduced when deformable covers 204 are installed to protect surface 210 of wall 206 for closet 208.

Figure 3:
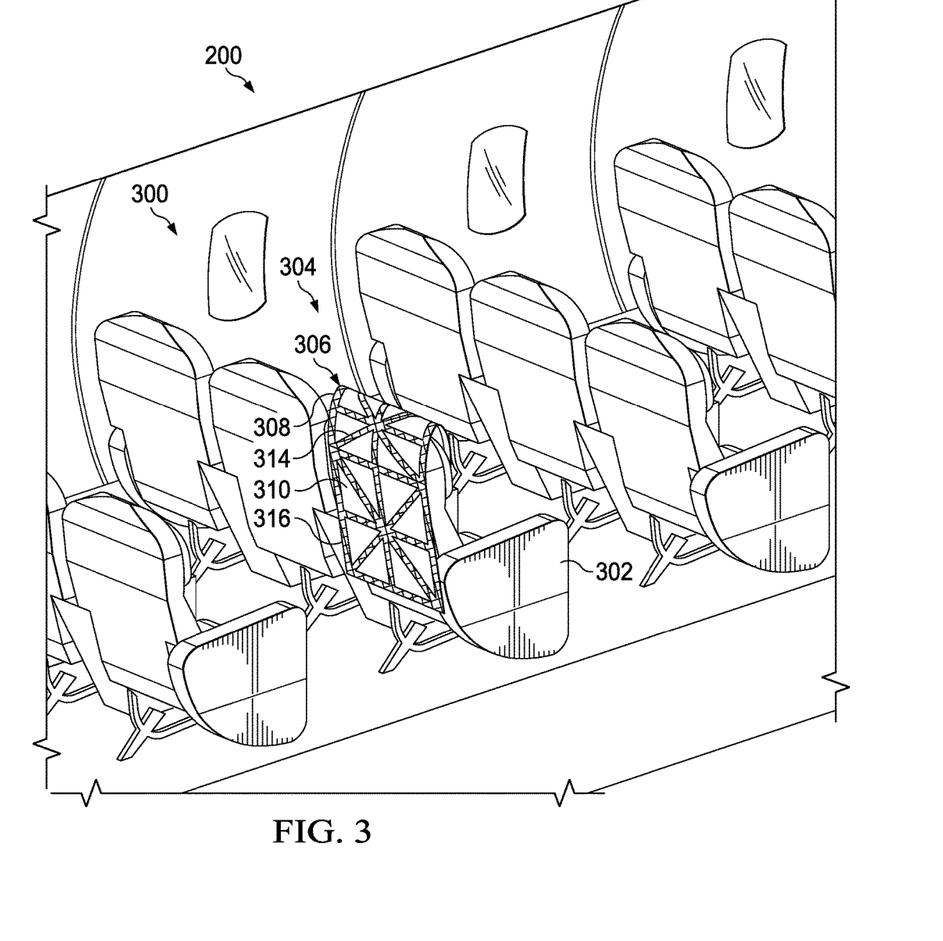
FIG. 3 is another illustration of a passenger cabin with structures in accordance with an illustrative embodiment.

Turning now to FIG. 3, another illustration of a passenger cabin with structures is depicted in accordance with an illustrative embodiment. In this view of passenger cabin 200, passenger seats 300 are depicted. Passenger seats 300 are physical examples of structures 104 in FIG. 1.

In this illustrative example, passenger seat 302 in passenger seats 300 may be protected using protection system 304. Protection system 304 includes deformable covers 306. Protection system 304 is an example of a physical implementation for protection system 110 and deformable covers 306 are examples of physical implementations for deformable covers 112 in protection system 110 shown in block form in FIG. 1.

As depicted, deformable covers 306 include deformable cover 308 and deformable cover 310. As depicted, deformable cover 308 has hook fastener 314 and deformable cover 310 has hook fastener 316.

In this illustrative example, deformable cover 308 is draped over passenger seat 302 to cover a portion of passenger seat 302. Deformable cover 310 is connected to deformable cover 308. In particular, a loop fastener (not shown) for deformable cover 310 may be connected to hook fastener 314 on deformable cover 308.

In this manner, deformable covers 306 may be configured to cover passenger seat 302. If additional coverage is needed, additional deformable covers may be used. As a result, custom designed and manufactured covers for passenger seats 300 may be unnecessary. In this manner, deformable covers 306 may use template covers for long-term covers for structures such as passenger seats 300.

In another illustrative example, deformable cover 308 may be wrapped around passenger seat 302. Depending on the size of deformable cover 310, deformable cover 310 may be wrapped around passenger seat 302 by itself. For example, hook fastener 314 on deformable cover 308 may engage a loop fastener (not shown) on the opposite side of deformable cover 308 to secure deformable cover 308 around passenger seat 302.

In other illustrative examples, deformable cover 308 and deformable cover 310 may be connected to each other through the hook fasteners and loop fasteners on the deformable covers and wrapped around passenger seat 302. The hook fasteners and loop fasteners may be used to secure the deformable covers to each other around passenger seat 302. Of course, depending on the size of the deformable covers, one or more additional deformable covers may be used to wrap or cover passenger seat 302.

When used as long-term covers or even as short-term covers, openings, flaps, transparent areas, or other features may be present on deformable covers 306 to provide viewing or access to portions of the structure. For example, a transparent or open area may be present to allow viewing of a display device on a headrest of a passenger seat.

FIGS. 4-7 are illustrations of a deformable cover. The illustration of the deformable cover in these figures is an example of one possible physical implementation for deformable cover 114 shown in block form in FIG. 1.

Figure 4:
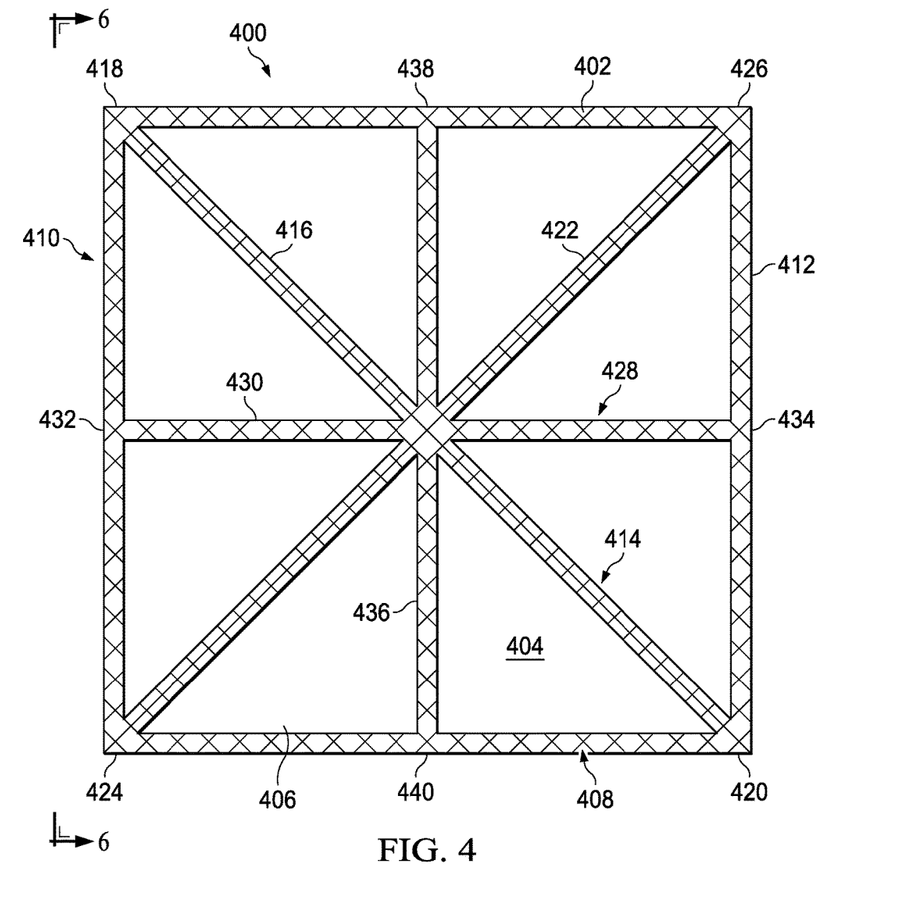
FIG. 4 is an illustration of a deformable cover in accordance with an illustrative embodiment.

Turning first to FIG. 4, an illustration of a deformable cover is depicted in accordance with an illustrative embodiment. In this illustration, in this view of deformable cover 400, hook fastener 402 is present on surface 404 on first side 406 of deformable cover 400. Hook fastener 402 is physically associated with first side 406 of deformable cover 400.

As depicted, hook fastener 402 has pattern 408 and is comprised of sections 410. In the illustrative example, a number of sections 410 extends around periphery 412 of deformable cover 400. In the illustrative examples, "a number of," when used with reference items, means one or more items. For example, a number of sections 410 is one or more sections in sections 410.

In this illustrative example, the number of sections 410 includes a number of diagonal sections 414 extending across deformable cover 400. In these illustrative examples, the number of diagonal sections 414 may allow for deformable cover 400 to be more easily connected to another deformable cover.

As depicted, diagonal section 416 in the number of diagonal sections 414 extends from corner 418 to corner 420 of deformable cover 400. As another example, diagonal section 422 in the number of diagonal sections 414 extends from corner 424 to corner 426 of deformable cover 400.

As depicted, the number of sections 410 also includes a number of mid-sections 428. In these illustrative examples, the number of mid-sections 428 may allow for deformable cover 400 to be connected to another deformable cover more easily.

For example, the number of mid-sections 428 includes mid-section 430. Mid-section 430 extends from midpoint 432 to midpoint 434 on periphery 412 of deformable cover 400. Additionally, mid-section 436 is present in the number of mid-sections 428. Mid-section 436 extends from midpoint 438 to midpoint 440 on periphery 412 of deformable cover 400.

Figure 5:
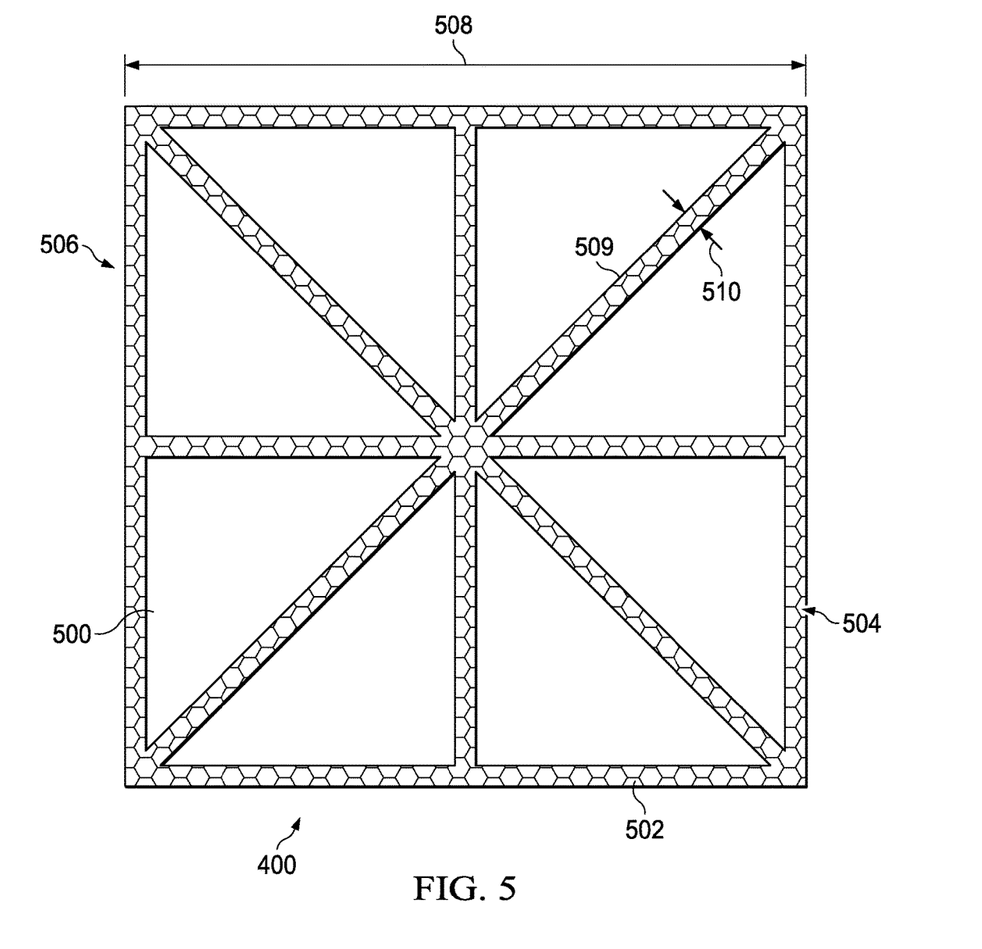
FIG. 5 is an illustration of a second side of a deformable cover in accordance with an illustrative embodiment.

With reference next to FIG. 5, an illustration of a second side of a deformable cover is depicted in accordance with an illustrative embodiment. In this figure, a view of second side 500 of deformable cover 400 is shown. Second side 500 is opposite of first side 406 in FIG. 4.

In this view, loop fastener 502 is illustrated in this view of deformable cover 400. Loop fastener 502 is physically associated with second side 500 of deformable cover 400. As depicted, loop fastener 500 has pattern 504 formed by sections 506. Pattern 504 may be substantially the same as pattern 408 for hook fastener 402 on first side 406 of deformable cover 400 in FIG. 4.

In this illustrative example, first side 406 may be considered a front side while second side 500 is a backside. The backside is the side of deformable cover 400 that contacts or touches a structure in these illustrative examples. Second side 500 may be selected as the backside such that loop fastener 502 may contact a structure while contact by hook fastener 402 may be reduced or avoided. In this manner, the occurrence of an inconsistency caused by hook fastener 402 may be reduced.

The differentiation between first side 406 and second side 500 may be made by examining the connectors, hook fastener 402 and loop fastener 502. The differentiation may be made easier for an operator through the use of a graphical indicator such as color, text, a graphic, or some other suitable graphical indicator. For example, first side 406 may have the color orange while second side 500 may have the color red.

As depicted, deformable cover 400 has a square shape in which the sides have length. Length 508 may vary depending on the particular implementation. For example, length 508 may be about 2 feet, 3 feet, 7 feet, 10 feet, or some other suitable dimension depending on the particular implementation.

Further, section 509 in sections 506 may have width 510. Width 510 may have various values. For example, width 510 may be from about 0.1 inches to about 2 inches. Further, different sections within sections 506 may have different widths. Also, hook fastener 402 on first side 406 also may have similar dimensions.

Further, the configuration of sections 410 for hook fastener 402 and sections 506 for loop fastener 502 may be selected in a number of different ways. For example, sections 410 and sections 506 may have a configuration selected to reduce the amount of effort needed by an operator to separate flexible covers from each other. Additionally, the configuration of the sections may be selected to provide a desired level of connectivity between deformable covers.

Figure 6:
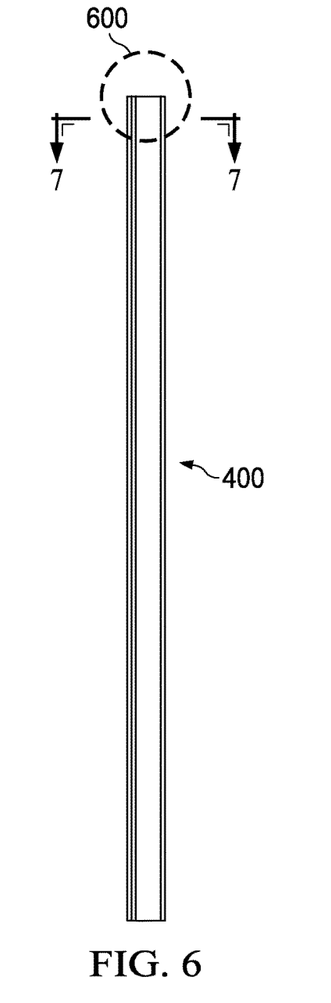
FIG. 6 is an illustration of another view of a deformable cover in accordance with an illustrative embodiment.

With reference now to FIG. 6, an illustration of another view of a deformable cover is depicted in accordance with an illustrative embodiment. In this figure, a view of deformable cover 400 viewed in the direction of lines 6-6 in FIG. 4 is depicted.

As depicted, deformable cover 400 is shown as being substantially flat or planar. Of course, deformable cover 400 may change shape to substantially conform to the shape of a structure in some illustrative examples.

Figure 7:
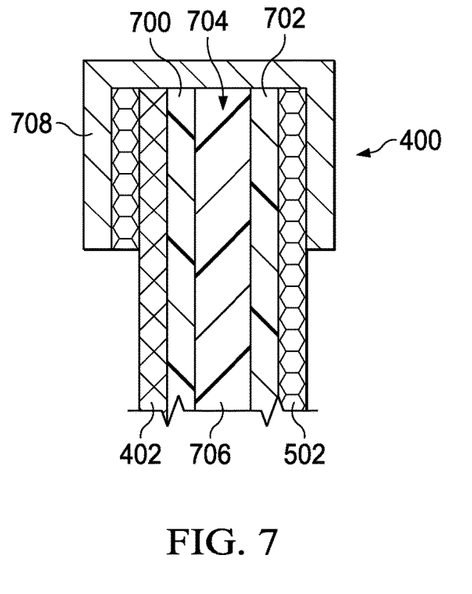
FIG. 7 is an illustration of a cross-sectional view of a deformable cover in accordance with an illustrative embodiment.

A more detailed view of section 600 is shown in FIG. 7 below. The more detailed view in FIG. 7 is a cross-sectional view of section 600.

With reference now to FIG. 7, an illustration of a cross-sectional view of a deformable cover is depicted in accordance with an illustrative embodiment. In this figure, a cross-sectional view of deformable cover 400 in section 600 is shown taken along lines 7-7 in FIG. 6.

As depicted, deformable cover 400 is comprised of first layer 700 and second layer 702. First layer 700 forms first side 406 of deformable cover 400. Second layer 702 forms second side 500 of deformable cover 400.

In this illustrative example, first layer 700 and second layer 702 may be comprised of a material selected from at least one of cloth, fabric, plastic, nylon, cotton, or some other suitable type of material. First layer 700 and second layer 702 may be comprised of the same type of material or different materials depending the particular implementation.

For example, when used in an aircraft, the material for first layer 700 and second layer 702 may be selected to be fire retardant, self extinguishing, or both. Additionally, both instances may be a criteria in selecting material. The material also may be selected to be deformable or malleable in a manner that maintains a shape that substantially conforms to a surface having at least a 0.25 inch radius. Further, the material may be selected to avoid the release of toxic fumes when exposed to heat. Material also may be selected to reduce or prevent inconsistencies such as scratches or abrasions to a structure. The material may also be selected to be washable and markable. The color of the material may be selected to reduce diminishing of light within the aircraft. In other words, a brighter color may be selected as opposed to a darker color. For example, yellow may be selected instead of navy blue as a color for the material As depicted, hook fastener 402 is adjacent to first layer 700 and loop fastener 502 is adjacent to second layer 702. Cavity 704 is located between first layer 700 and second layer 702. In other words, these two layers may form cavity 704.

The material for hook fastener 402 and loop fastener 502 may be selected based on a particular implementation. With respect to use in aircraft, the material may be, for example, plastic. In the illustrative example, the plastic may be selected to be non-chemically reactive. In other words, it may be desirable that the plastic be chemically inert with respect to exposure to the environment in the aircraft. Additionally, the material may be selected to be mold resistant and washable. Further, the material also may be selected to avoid the release of toxic fumes when exposed to heat.

In this illustrative example, third layer 706 may be placed into cavity 704. In some cases, third layer 706 may be omitted. In these illustrative examples, third layer 706 also may be deformable. In some cases, third layer 706 may only be flexible or may even be rigid. Third layer 706 may be comprised of various materials. For example, third layer 706 may be selected from at least one of a biaxially-oriented polyethylene terephthalate (boPET) polyester film, a fiberglass sheet, a foam sheet, a composite sheet, a honey comb sandwich panel, or other suitable material for a component.

The selection of third layer 706 may be based on various types of criteria. For example, third layer 706 may be selected to have characteristics similar to those used for first layer 700 and second layer 702. Additionally, third layer 706 may be selected to have a desired weight, conform to the shape of a structure, prevent the formation of inconsistencies formed by impacts, and other suitable criteria.

Also depicted in this figure is connector 708. Connector 708 is configured to connect first layer 700 and second layer 702 to each other. In particular, connector 708 may be configured to close off cavity 704. In some illustrative examples, first layer 700 and second layer 702 may be connected to each other using other mechanisms such as thread, a fastener, a rivet, a plastic line or some other suitable type of connector system.

Further, hook fastener 402 is connected to first layer 700 and loop fastener 502 is connected to second layer 702. This connection may be made using the connection system, connector 708, or some combination thereof.

The illustration of deformable cover 400 in FIGS. 4-7 is only shown as one example of a physical implementation for deformable cover 114 shown in block form in FIG. 1. This illustration is not meant to limit the manner in which deformable cover 114 may be implemented.

For example, deformable cover 400 is shown as having a square shape. Other deformable covers may have other shapes in particular implementations. For example, the deformable cover may be selected from one of a rectangle, an oval, a circle, a pentagon, a hexagon, a triangle, an irregular shape, or some other suitable shape.

As yet another illustrative example, in some cases, deformable cover 400 may have only first layer 700. Second layer 702 may not be present when cavity 704 for third layer 706 is unnecessary. In this implementation, both hook fastener 402 and loop fastener 502 may be attached to first layer 700. In still other illustrative examples, additional layers may be present between first layer 700 and second layer 702 that form another cavity in addition to cavity 704. This additional cavity may hold another layer in addition to third layer 706.

Additionally, deformable cover 400 may include other features. For example, without limitation, deformable cover 400 may include an opening, transparent areas, flaps, or other suitable features.

The different components shown in FIGS. 2-7 may be combined with components in FIG. 1, used with components in FIG. 1, or a combination of the two. Additionally, some of the components in FIGS. 2-7 may be illustrative examples of how components shown in block form in FIG. 1 can be implemented as physical structures.

Figure 8:
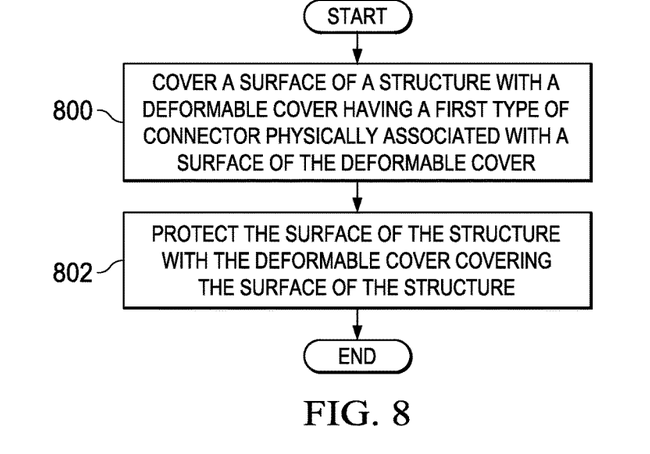
FIG. 8 is an illustration of a flowchart of a process for protecting a structure in accordance with an illustrative embodiment.

Turning now to FIG. 8, an illustration of a flowchart of a process for protecting a structure is depicted in accordance with an illustrative embodiment. The process illustrated in FIG. 8 may be implemented in protection environment 100 in FIG. 1. In particular, the process may be implemented using protection system 110 to protect one or more structures 104 in FIG. 1.

The process begins by covering a surface of a structure with a deformable cover having a first type of connector physically associated with a surface of the deformable cover (operation 800). In this illustrative example, operation 800 may be performed with the deformable cover connected to the structure. In other words, when put in place, the deformable cover covers the surface in operation 800. The first connector is configured to connect to a second type of connector on a structure.

The process protects the surface of the structure with the deformable cover covering the surface of the structure (operation 802), with the process terminating thereafter. The protection provided by the deformable cover may reduce the occurrence of the formation of inconsistencies on the structure when other operations are performed around or on the structure.

Figure 9:
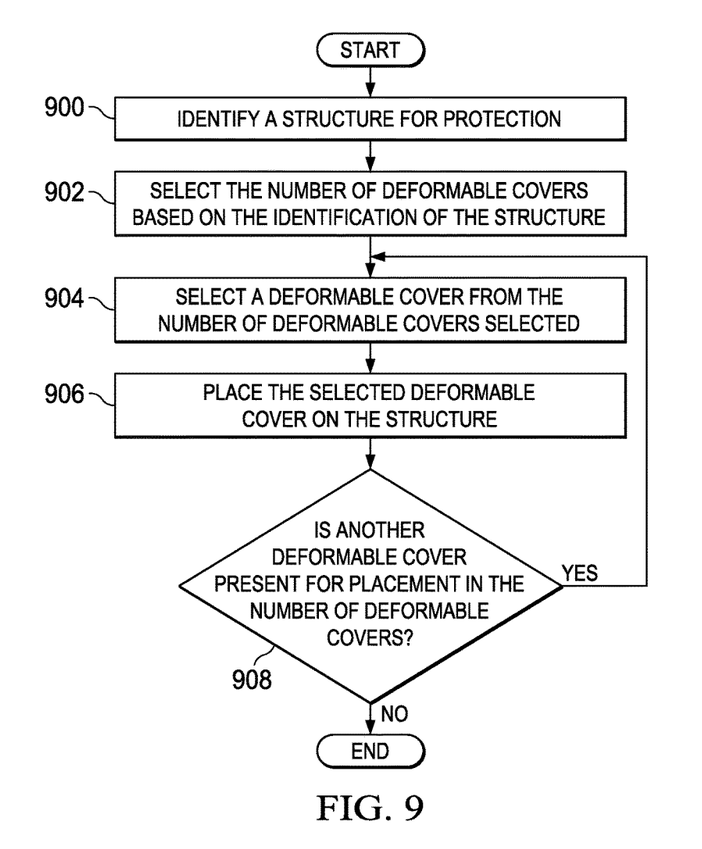
FIG. 9 is an illustration of a flowchart of a process for protecting a structure in accordance with an illustrative embodiment.

Turning next to FIG. 9, an illustration of a flowchart of a process for protecting a structure is depicted in accordance with an illustrative embodiment.

The process illustrated in FIG. 9 may be implemented in protection environment 100 in FIG. 1. In particular, the process may be implemented using protection system 110 to protect one or more structures 104 in FIG. 1.

The process begins by identifying a structure for protection (900). The number of deformable covers is selected based on the identification of the structure (operation 902). The number of deformable covers may be selected such that the deformable covers cover a portion or all of the surface of the structure.

The process selects a deformable cover from the number of deformable covers selected (operation 904). The process then places the selected deformable cover on the structure (operation 906). Placement may be performed in a number of different ways, depending on the shape of the structure.

In other illustrative examples, the deformable cover may have a first connector that is attached to a second connector located on the structure. The second connector on the structure may be a connector directly connected to the deformable cover. In other illustrative examples, the second connector may be located on another deformable cover that has been previously placed on the structure.

A determination is made as to whether another deformable cover is present for placement in the number of deformable covers (operation 908). If another deformable cover is present for placement, the process returns to operation 904. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
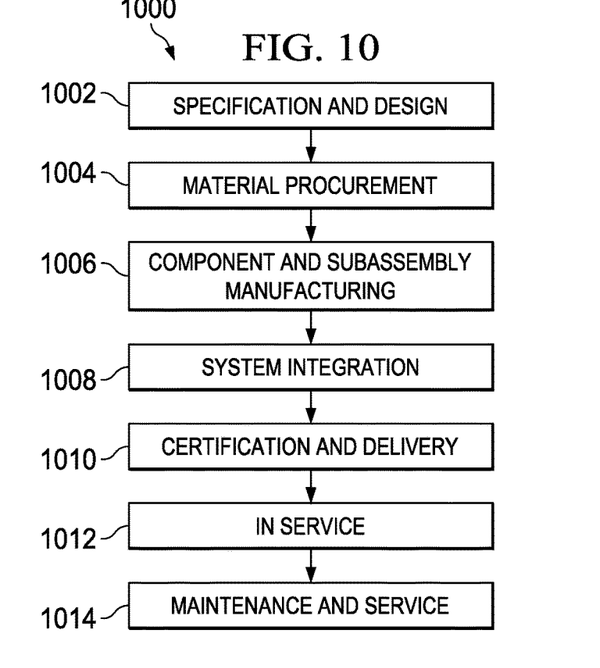
FIG. 10 is an illustration of an aircraft manufacturing and service method in the form of a block diagram in accordance with an illustrative embodiment.
Figure 11:
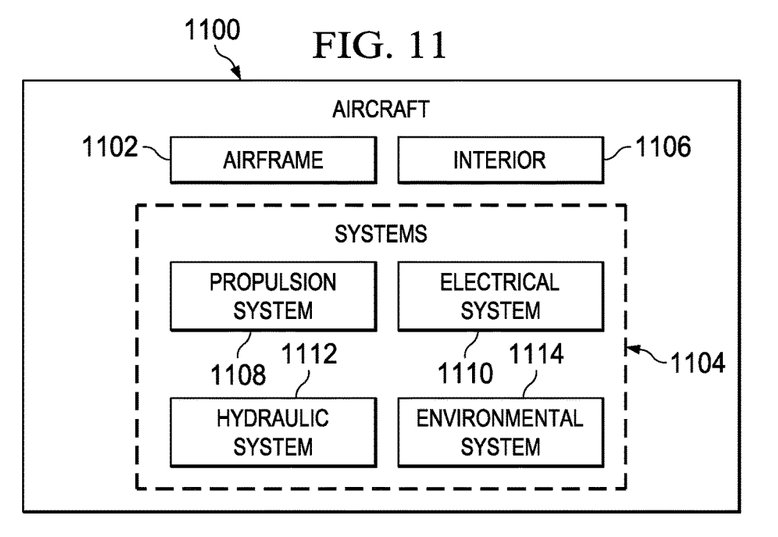
FIG. 11 is an illustration of an aircraft in the form of a block diagram in which an illustrative embodiment may be implemented.

The illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in the form of a block diagram in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in the form of a block diagram in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1000 in FIG. 10.

As yet another example, one or more apparatus embodiments, method embodiments, or a combination thereof may be utilized during production stages, such as system integration 1008 in FIG. 10. For example, deformable covers may be used during the installation of various components during system integration 1008. The deformable covers may be configured to provide protection to structures installed or assembled from components. One or more apparatus embodiments, method embodiments, or a combination thereof may be utilized while aircraft 1100 is in service 1012 and/or during maintenance and service 1014 in FIG. 10. Protective covers may be used to provide protection to structures during operations performed during maintenance and service 1014. These operations may include those for forming routine maintenance, upgrades, refurbishment, inspections, and other suitable operations. The use of a number of the different illustrative embodiments may substantially expedite the assembly of and/or reduce the cost of aircraft 1100.

Thus, the illustrative embodiments provide a method and apparatus for protecting structures. The deformable covers may be connected to structures and to each other. With multiple deformable covers, a protective layer may be formed around a structure without requiring a customized protective cover. Further, the first type of connectors and the second type of connectors are selected to allow easier configuration and removal of the protective covers. The selection of the configuration of the first type of connectors and the second type of connectors may be performed such that these types of connectors are sufficient to hold deformable covers in place in different positions with respect to each other, a structure, or both.

Further, the deformable covers may have different sizes and shapes in an illustrative embodiment. With the different sizes and shapes, covering a structure may be performed more easily when connecting deformable covers to each other to cover a structure.

In this manner, the deformable covers may provide a custom fit for covering a structure. This custom fit is provided in the illustrative examples without requiring designing and manufacturing a custom cover for each particular structure. As a result, the time and effort needed to perform operations on a platform such as an aircraft may be reduced through the use of deformable covers in accordance with an illustrative embodiment.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a deformable cover configured to change a shape and to conform to a surface of a structure, the deformable cover having a first side and a second side; and
    a first type of connector affixed in a pattern on the first side of the deformable cover, wherein the first type of connector is configured to connect to a second type of connector;
    wherein the second type of connector is affixed in the pattern on the second side of the deformable cover; and
    wherein the pattern comprises a first band around an entire periphery of the deformable cover, second bands between each corner of the deformable cover, and third bands between each midpoint of each side of the deformable cover;
    wherein the deformable cover comprises: a first layer, a second layer connected to the first layer, a cavity between the first layer connected to the second layer, and a third layer located in the cavity; and
    wherein a third type of connector is configured to connect the first layer and the second layer together and to close off the cavity.

2. The apparatus of claim 1, wherein the first type of connector is a loop fastener and the second type of connector is a hook fastener.

3. The apparatus of claim 1, wherein the first type of connector is selected from one of a magnet or a magnetic material and the second type of connector is selected from one of a magnet or a magnetic material.

4. The apparatus of claim 1, wherein the third layer is selected from at least one of a biaxially-oriented polyethylene terephthalate (boPET) polyester film, a fiberglass sheet, a foam sheet, a composite sheet, or a honey comb sandwich panel.

5. The apparatus of claim 1, wherein the second type of connector is located on at least one of the surface on the structure or a second deformable cover on the structure.

6. The apparatus of claim 1, wherein the structure is a platform, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a dam, a house, a manufacturing facility, and a building.

7. An aircraft protection system comprising:
    a deformable cover configured to change shape and to conform to a surface of a structure in an aircraft, the surface;
    a loop fastener physically associated with a first side of the deformable cover; and
    a hook fastener physically associated with the structure, wherein the loop fastener is configured to connect to the hook fastener on the structure in the aircraft;
    wherein the loop fastener is affixed to the deformable cover in a pattern comprising a first band around an entire periphery of the deformable cover, second bands between each corner of the deformable cover, and third bands between each midpoint of each side of the deformable cover;
    wherein the deformable cover comprises: a first layer, a second layer connected to the first layer, a cavity between the first layer connected to the second layer, and a third layer located in the cavity; and
    wherein a third type of connector is configured to connect the first layer and the second layer together and to close off the cavity.

8. The aircraft protection system of claim 7, wherein the hook fastener is physically associated with the structure by being directly connected to the structure.

9. The aircraft protection system of claim 8, wherein the hook fastener is directly connected to the structure with an adhesive.

10. The aircraft protection system of claim 7, wherein the hook fastener is physically associated with the structure by being indirectly connected to the structure.

11. A method for protecting a structure, the method comprising:
    covering a surface of the structure with a deformable cover having a first type of connector physically associated with a first side of the deformable cover, wherein the first type of connector is configured to connect to a second type of connector affixed to a surface of the structure; and
    protecting the surface of the structure with the deformable cover by affixing at least a portion of the first type of connector to at least a portion of the second type of connector;
    wherein the first type of connector is arrayed in a first band around an entire periphery of the deformable cover, second bands between each corner of the deformable cover, and third bands between each midpoint of each side of the deformable cover.

12. The method of claim 11 further comprising:
    connecting the first type of connector with the second type of connector such that the surface of the structure is covered by the deformable cover.

13. The method of claim 11, wherein the first type of connector is a loop fastener and the second type of connector is a hook fastener.

* * * * *

UNITED STATES PATENT AND TRADEMARK OFFICE
CERTIFICATE OF CORRECTION

PATENT NO.        : 9,986,801 B1
APPLICATION NO.   : 13/948555
DATED             : June 5, 2018
INVENTOR(S)       : Stenberg It is certified that error appears in the above-identified patent and that said Letters Patent is hereby corrected as shown below:

In the Claims

Column 14, Line 11, delete ", the surface" end line 11 to read --an aircraft;--
Column 14, Line 46, change "a surface" to read --the surface--

Signed and Sealed this
Fourth Day of September, 2018

Andrei Iancu
*Director of the United States Patent and Trademark Office*